E. BILLINGER

Grain-Drill.

No. { 2,229, 33,233. }

Patented Sept. 10, 1861.

Witnesses:

Inventor:

UNITED STATES PATENT OFFICE.

EARLL BELLINGER, OF HICKORY CORNERS, MICHIGAN.

IMPROVEMENT IN SEEDING-MACHINES.

Specification forming part of Letters Patent No. 33,233, dated September 10, 1861.

*To all whom it may concern:*

Be it known that I, EARLL BELLINGER, of Hickory Corners, in the county of Barry and State of Michigan, have invented a new and Improved Seeding-Machine; and I do hereby delare that the following is a full, clear, and exact description of the same, reference being had to the accompanying drawings, forming part of this specification, in which—

Figure 1:
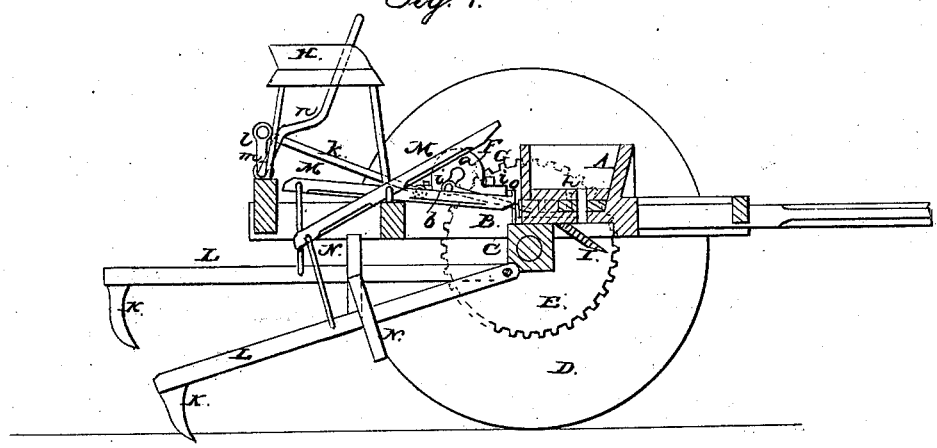
Figure 2:
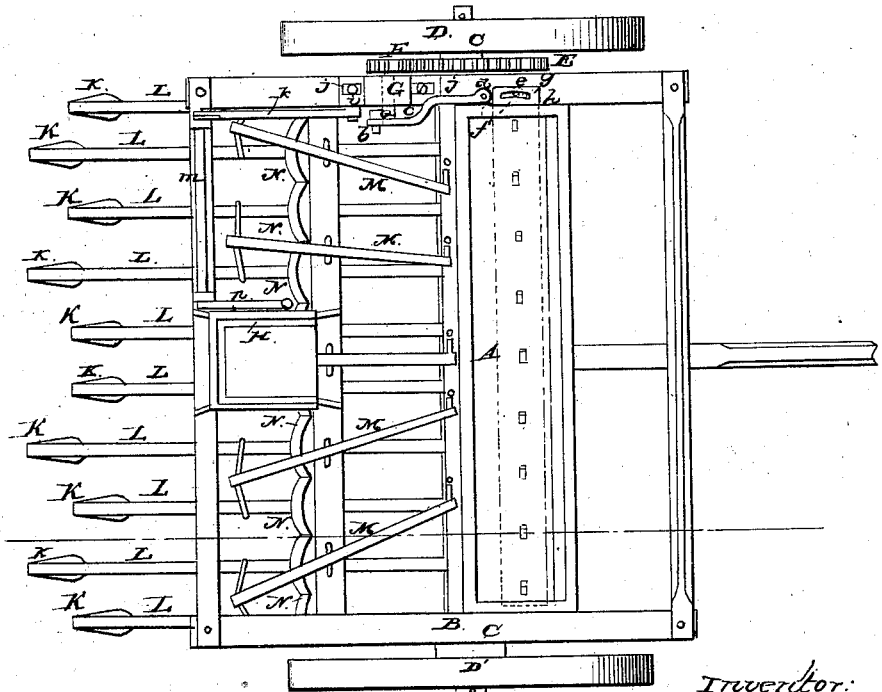

Figure 1 represents a longitudinal vertical section of this invention, and Fig. 2 a plan or top view of the same.

Similar letters of reference in both figures indicate corresponding parts.

To enable those skilled in the art to make and use my invention, I will describe its con-construction and operation with reference to the drawings.

The seed box or hopper A is mounted on a frame, B, which is supported by the axle C, to which the wheels D D' are attached. Both these wheels turn loosely on the axle, the latter remaining stationary, and a cog-wheel, E, is firmly secured to the inside of the driving-wheel D. This cog-wheel gears into a pinion, F, which is mounted on an arbor, a, that has its bearing in a box, G, and which carries the crank b. This crank connects by means of a rod, c, with one arm, d, of a bell-crank lever, d e, which has its fulcrum on a pivot, f, under the bottom of the hopper. The other, arm, e of this lever is bent up at its end, and catches into a slot, g, on the end of the seed-slide h. As the crank-shaft a revolves, a vibrating motion is imparted to the bell-crank lever d e, and the end of the arm e, as it traverses through the slot g, pushes the seed-slide in and out. The slot is arranged in such relation to the end of the arm e that the slide h makes a short stop at each extremity of its stroke, thereby giving time to the seed-cells to fill and to discharge regularly.

The journal-box G, which forms the bearing of the crank-shaft a, is secured to the side timber of the frame B by means of bolts i, passing through slots j in the side flanges of the journal-box, so that a longitudinal sliding motion can be imparted to the latter, and that by moving it in one direction the pinion F is thrown in and by moving it in the opposite direction the pinion F is thrown out of gear with the cog-wheel E. The box G connects by a rod, k, with an arm, l, that is secured to a vibrating shaft, m, and a hand-lever, n, which extends up on the side of the driver's seat H, serves to impart the motion desired to said shaft. By moving this lever in one direction or in the other the pinion is thrown in or out of gear, thus giving to the driver entire control over the operation of the machine. As the seed is discharged from the hopper through the operation of the seed-slide, it drops on the apron I, which scatters it evenly on the ground, and the seed is covered up by the action of cultivator-teeth or hoes K, which are secured to standards L, hinged to the central cross-timber of the frame B. Each pair of hoes is suspended from the end of a foot-lever, M, and the several foot-levers converge in front of the driver's seat, so that they can all be reached conveniently with the foot without leaving the seat. By these means each pair of hoes can be raised from the ground independently of the other whenever it is desired.

The several hoes are kept at a proper distance apart by means of oblong guide-pieces N, that are secured to the standards, and these guide-pieces are equally effective when one or more pairs of the hoes are raised, and when all the hoes are lowered.

When it is desired to keep all the hoes out of the ground the front ends of the foot-levers M are passed under hooks o, that are inserted in the central cross-timber of the frame.

This machine is particularly intended to work among stumps, roots, or other obstructions, and the wheels must be made big enough to allow every part of the machine to clear such obstructions. If one pair of the hoes comes opposite to a stump, said hoes are raised, while at the same time the rest continue to do their work without interruption.

Having thus fully described my invention, what I claim as new, and desire to secure by Letters Patent, is—

The arrangement of the hinged hoe-levers L, guides N, and foot-levers M with the lever n, rod k, pinion F, box G, and seat H, all as herein shown and described.

EARLL BELLINGER.

Witnesses:
ISAAC TOLLER,
ISAAC W. TOLLER.